United States Patent
Futagi et al.

(10) Patent No.: US 11,455,115 B2
(45) Date of Patent: Sep. 27, 2022

(54) STORAGE DEVICE

(71) Applicant: Kioxia Corporation, Minato-ku (JP)

(72) Inventors: Junpei Futagi, Yokohama (JP);
Kentaro Umesawa, Kawasaki (JP)

(73) Assignee: Kioxia Corporation, Minato-ku (JP)

( * ) Notice: Subject to any disclaimer, the term of this patent is extended or adjusted under 35 U.S.C. 154(b) by 322 days.

(21) Appl. No.: 16/804,053

(22) Filed: Feb. 28, 2020

(65) Prior Publication Data
US 2021/0042035 A1 Feb. 11, 2021

(30) Foreign Application Priority Data
Aug. 9, 2019 (JP) .............................. JP2019-147505

(51) Int. Cl.
*G06F 3/06* (2006.01)
*G06F 11/14* (2006.01)
*G06F 21/57* (2013.01)

(52) U.S. Cl.
CPC ............ *G06F 3/065* (2013.01); *G06F 3/0619* (2013.01); *G06F 3/0659* (2013.01); *G06F 3/0679* (2013.01); *G06F 11/1451* (2013.01); *G06F 11/1469* (2013.01); *G06F 21/572* (2013.01); *G06F 2201/82* (2013.01); *G06F 2221/033* (2013.01)

(58) Field of Classification Search
CPC .. G06F 11/1451; G06F 11/1469; G06F 3/065; G06F 3/0619; G06F 3/0659; G06F 3/0679; G06F 21/572; G06F 2201/82; G06F 2221/033

See application file for complete search history.

(56) References Cited

U.S. PATENT DOCUMENTS

| 8,490,189 | B2 | 7/2013 | Prakash et al. | |
|---|---|---|---|---|
| 9,530,004 | B2 | 12/2016 | Yajima et al. | |
| 2003/0163753 | A1* | 8/2003 | Lu | G06F 11/1417 714/2 |
| 2008/0186753 | A1* | 8/2008 | Buer | G11C 17/16 365/96 |
| 2013/0124932 | A1 | 5/2013 | Schuh et al. | |
| 2014/0229757 | A1* | 8/2014 | Danayakanakeri | G06F 11/201 714/4.11 |
| 2015/0220319 | A1* | 8/2015 | Weiss | H04W 12/35 713/168 |

(Continued)

FOREIGN PATENT DOCUMENTS

JP 2015-055898 A 3/2015

*Primary Examiner* — Jigar P Patel
(74) *Attorney, Agent, or Firm* — Oblon, McClelland, Maier & Neustadt, L.L.P.

(57) ABSTRACT

According to one embodiment, a storage device includes a nonvolatile memory and a controller. The controller is configured to control data write to the nonvolatile memory and data read from the nonvolatile memory based on a command from a host. The controller includes at least one processor. The nonvolatile memory stores first firmware for normal operation and second firmware for recovery. The first firmware is firmware to cause the at least one processor to control the data write and the data read based on the command. The second firmware is firmware to cause the at least one processor to recover the first firmware. The second firmware is stored in the nonvolatile memory with higher reliability than the first firmware.

20 Claims, 7 Drawing Sheets

(56) References Cited

U.S. PATENT DOCUMENTS

| | | |
|---|---|---|
| 2015/0235020 A1 | 8/2015 | Nagai et al. |
| 2015/0310219 A1* | 10/2015 | Haager .................... H04L 9/14 713/165 |
| 2017/0185781 A1* | 6/2017 | Kim .......................... G06F 8/65 |
| 2018/0096154 A1* | 4/2018 | Shivanna .............. G06F 21/572 |
| 2018/0157839 A1 | 6/2018 | Pearson |

* cited by examiner

STORAGE DEVICE

CROSS-REFERENCE TO RELATED APPLICATIONS

This application is based upon and claims the benefit of priority from Japanese Patent Application No. 2019-147505, filed Aug. 9, 2019, the entire contents of which are incorporated herein by reference.

FIELD

Embodiments described herein relate generally to a storage device.

BACKGROUND

Recently, various types of storage devices such as a hard disk drive (HDD) and a solid-state drive (SSD) have been widely spread. This type of storage device performs a process such as data write and data read by procedures provided by programs called firmware and the like. If the firmware is tampered with, the storage device might perform an unauthorized operation. The same applies to the case where data that affects the operation of the storage device is tampered with. A storage device having a security function of verifying the reliability of data and programs including firmware has appeared accordingly. The security function of verifying the reliability of firmware, for example, at boot of the storage device may be called a secure boot function.

When firmware is tampered with in a storage device having a secure boot function, the secure boot function inhibits the storage device from being activated. To recover the storage device, it is necessary to request the manufacturer or the like to recover the storage device.

If the storage device itself has a function of recovering the storage device by overwriting the firmware that has been tampered with to firmware for recovering the firmware, it is unnecessary to request the manufacturer or the like to recover the storage device. If, however, the firmware for recovery is also tampered with, it is no longer possible to recover the storage device on the user side.

DETAILED DESCRIPTION

Various embodiments will be described hereinafter with reference to the accompanying drawings.

In general, according to one embodiment, a storage device includes a nonvolatile memory and a controller. The controller is configured to control data write to the nonvolatile memory and data read from the nonvolatile memory based on a command from a host. The controller includes at least one processor. The nonvolatile memory stores first firmware for normal operation and second firmware for recovery. The first firmware is firmware to cause the at least one processor to control the data write and the data read based on the command. The second firmware is firmware to cause the at least one processor to recover the first firmware. The second firmware is stored in the nonvolatile memory with higher reliability than the first firmware.

First Embodiment

First, a first embodiment will be described.

Figure 1:
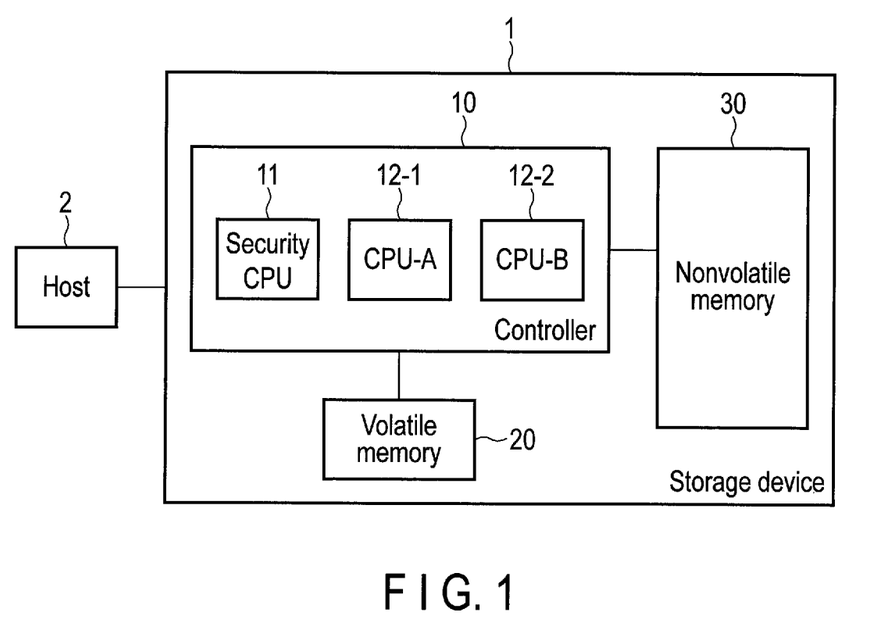
FIG. 1 is a block diagram illustrating an exemplary configuration of a storage device according to a first embodiment.

FIG. 1 a block diagram illustrating an exemplary configuration of a storage device 1 according to the first embodiment.

The storage device 1 receives a command from a host 2 connected thereto via an interface such as PCIe (registered trademark), performs a process corresponding to the command, and transmits a result of the process to the host 2. The command received by the storage device 1 includes a write command to request data write and a read command to request data read. The storage device 1 may also receive various control commands, such as a command to define a partition on a storage area.

The storage device 1 includes a controller 10 configured as, for example, a system-on-a-chip (SoC), a volatile memory 20 such as a DRAM, and a nonvolatile memory 30 such as a flash memory.

The controller 10 performs a process of writing data to the nonvolatile memory 30 and a process of reading data from the nonvolatile memory 30 while using the volatile memory 20 as a temporary storage area for data. The controller 10 controls the nonvolatile memory 30 based on a command from the host 2. The controller 10 includes a plurality of CPUs (11, 12-1 and 12-2) including a Security CPU 11.

Means for accessing information stored in a memory built in the Security CPU 11 is limited, and the reliability of the information is assured. The security CPU 11 is therefore a CPU with higher security than a commonly used CPU. Assume here that the controller 10 includes two commonly used CPUs (CPU-A 12-1 and CPU-B 12-2) in addition to the Security CPU 11. Assuring the reliability includes guaranteeing the issuer of programs by verifying it with a digital signature. Assuring the reliability also includes assuring integrity and, in other words, verifying the reliability includes verifying the integrity. The controller 10 causes the CPU-A 12-1 and the CPU-B 12-2 to cooperate with each other to perform a process of writing data to the nonvolatile memory 30 and a process of reading data from the nonvolatile memory 30. Alternatively, each of the CPU-A 12-1 and CPU-B 12-2 independently performs a process of writing data to the nonvolatile memory 30 and a process of reading data from the nonvolatile memory 30. Hereinafter, the CPU-A 12-1 and the CPU-B 12-2, which are commonly used CPUs, may collectively be referred to as a CPU 12.

The Security CPU 11, CPU-A 12-1 and CPU-B 12-2 perform processes by procedures provided by firmware (Security CPU FW 31 for normal operation, CPU-A FW 32-1 for normal operation and CPU-B FW 32-2 for normal operation, which will be described later) stored in the nonvolatile memory 30. Specifically, the Security CPU 11, CPU-A 12-1 and CPU-B 12-2 load the firmware from the nonvolatile memory 30 into the volatile memory 20 appropriately, for example, in a unit of a module, and execute the loaded firmware. The Security CPU 11 manages security assurance data (stored in, for example, ROM which is not shown) for verifying the reliability of each firmware. The Security CPU 11 verifies the reliability of each firmware using the security assurance data when the storage device 1 is booted, for example. That is, the storage device 1 has a secure boot function. The security assurance data managed by the Security CPU 11 can be accessed only from the Security CPU 11, and accordingly, if an attacker attempts to tamper with the security assurance data, the attacker has to cause the Security CPU 11 to perform an unauthorized operation. It is thus necessary for the attacker to tamper with the firmware of the Security CPU 11 first. However, tampering of the firmware of the Security CPU 11 can be detected by verifying the reliability when the storage device 1 is booted, for example. Therefore, since the reliability of the security assurance data managed by the Security CPU 11 is assured, the security assurance data can be treated as a starting point of the reliability (or, a root of trust). The security assurance data is not limited to specific information, but may be applied to various items of information such as a verification key and a MAC value.

Figure 2:
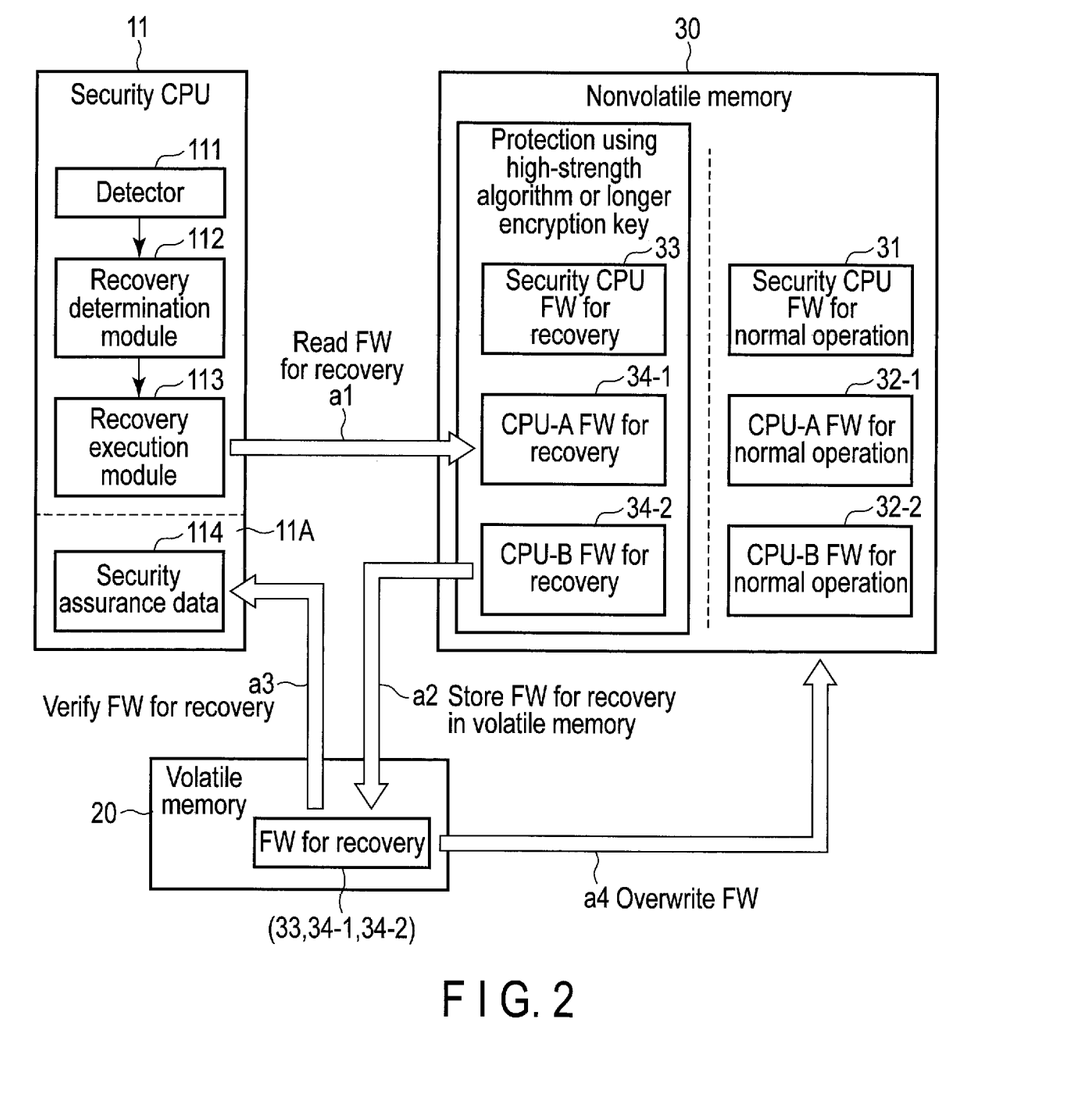
FIG. 2 is a block diagram illustrating a function of recovering firmware of the storage device according to the first embodiment.

The storage device 1 configured as described above has a function of recovering the firmware that has been tampered with. FIG. 2 is a block diagram illustrating a function of recovering the firmware of the storage device 1 according to the first embodiment.

The Security CPU 11 includes a detector 111, a recovery determination module 112 and a recovery execution module 113. These modules are realized by the Security CPU 11 that executes a program with high reliability as being stored in a memory which is accessible only by the Security CPU 11 and from which data can be read only. Alternatively, the program itself may be stored in a built-in memory 11A included in the Security CPU 11.

First, the nonvolatile memory 30 stores Security CPU FW 31 for normal operation which is firmware for the Security CPU 11, CPU-A FW 32-1 for normal operation which is firmware for the CPU-A 12-1, and CPU-B FW 32-2 for normal operation which is firmware for the CPU-B 12-2. Second, the nonvolatile memory 30 stores Security CPU FW 33 for recovery which is firmware for recovering the Security CPU FW 31, CPU-A FW 34-1 for recovery which is firmware for recovering the CPU-A FW 32-1, and CPU-B FW 34-2 for recovery which is firmware for recovering the CPU-B FW 32-2.

Among the Security CPU FW 31 for normal operation, CPU-A FW 32-1 for normal operation, CPU-B FW 32-2 for normal operation, the Security CPU FW 33 for recovery, CPU-A FW 34-1 for recovery, and CPU-B FW 34-2 for recovery, at least the Security CPU FW 33 for recover, the CPU-A FW 34-1 for recovery, and the CPU-B FW 34-2 for recovery are stored in the nonvolatile memory 30 in encrypted state. That is, the storage device 1 has at least a decryption function of decrypting encrypted programs and data. As will be described later in detail, the Security CPU FW 33 for recovery, the CPU-A FW 34-1 for recovery, and the CPU-B FW 34-2 for recovery are encrypted using an algorithm whose encryption strength is higher (or using an encryption key whose length is greater) than the Security CPU FW 31 for normal operation, the CPU-A FW 32-1 for normal operation, and the CPU-B FW 32-2 for normal operation. Thus, the firmware for recovery (33, 34-1 and 34-2) is stored in the nonvolatile memory 30 with higher reliability. The firmware for normal operation (31, 32-1 and 32-2) and the firmware for recovery (33, 34-1 and 34-2) may be stored in the nonvolatile memory 30 in compressed state if the storage device 1 has an additional function of decompressing compressed programs and data.

The detector 111 is a module that detects tampering of firmware for normal operation during the operation of the storage device 1, and detects an abnormal operation of the storage device 1, more specifically, an abnormal operation of the Security CPU 11, CPU-A 12-1 or CPU-B 12-2. Note that the tampering of firmware for normal operation while the storage device 1 is inactivated is detected by the foregoing secure boot function when the storage device 1 is booted. A method of detecting an abnormal operation is not limited to a specific one, and various known methods may be applied thereto.

When the detector 111 detects an abnormal operation of the storage device 1, the recovery determination module 112 determines whether the storage device 1 can be recovered by recovering the firmware for normal operation. This determination may be, for example, determination as to whether the detected abnormal operation is caused by a hardware failure. If it is not caused by a hardware failure, it is determined that the storage device 1 can be recovered by recovering the firmware for normal operation. The determination may also be determination to verify the reliability of the security CPU FW 31 for normal operation, CPU-A FW 32-1 for normal operation and CPU-B FW 32-2 for normal operation using the security assurance data 114 managed by the Security CPU 11. If tampering is detected, it is determined that the storage device 1 can be recovered by recovering the firmware for normal operation.

The recovery execution module 113 recovers firmware for normal operation when the recovery determination module 112 determines that the storage device 1 whose abnormal operation is detected can be recovered by recovering the firmware for normal operation. For example, when the detector 111 detects an abnormal operation of the CPU-A 12-1 and when the recovery determination module 112 determines that the CPU-A 12-1 can be recovered by recovering the CPU-A FW 32-1 for normal operation, the recovery execution module 113 overwrites the CPU-A FW 32-1 for normal operation to the CPU-A FW 34-1 for recovery and executes a process of rebooting the storage device 1. When the recovery determination module 112 determines that the storage device 1 cannot be recovered by recovering the firmware for normal operation, it may notify the host 2 of an error. When the recovery determination module 112 notifies the host 2 of the error, it may stop the storage device 1.

Even when the detector 111 detects tampering of, e.g., the CPU-A FW 32-1 for normal operation by the foregoing secure boot function at the time of boot of the storage device 1, the recovery execution module 113 may overwrite the CPU-A FW 32-1 for normal operation to the CPU-A FW 34-1 for recovery and reboot the storage device 1.

The firmware for recovery (33, 34-1 and 34-2) may be the same as the firmware for normal operation (31, 32-1 and 32-2) prepared as a backup, or may be firmware having the minimum necessary function of recovering the firmware for normal operation such as acquiring regular firmware for normal operation from the host 2. Recovering the firmware means, for example, that the firmware that has been tampered with is overwritten to the regular firmware to return to a state before the tampering.

Even though the CPU-A FW 32-1 for normal operation that has been tampered with is to be recovered by the CPU-A FW 34-1 for recovery, if the CPU-A FW 34-1 for recovery is also tampered with, the secure boot function that is performed when the storage device 1 is rebooted inhibits the storage device 1 from being booted. That is, it is no longer possible to recover the storage device 1 in body and it is necessary to request the manufacturer or the like to recover the storage device 1.

In the storage device 1, therefore, the firmware for recovery (33, 34-1 and 34-2) is stored in the nonvolatile memory 30 with higher reliability than the firmware for normal operation (31, 32-1 and 32-2). In the storage device 1, furthermore, when the firmware for normal operation is written to the firmware for recovery, the reliability of the firmware for recovery is verified using the security assurance data 114 that is managed by the Security CPU 11.

Storing the firmware for recovery in the nonvolatile memory 30 with higher reliability than the firmware for normal operation is achieved by encrypting the firmware for recovery using an algorithm whose encryption strength is high (or using an encryption key whose key length is great), as described above. For example, when the encryption is performed by a common key encryption method, a common key (encryption key) for decryption is managed by the Security CPU 11 as the security assurance data 114. A module that controls the encryption function of the storage device 1 obtains, as a parameter, information indicating the encryption key, which is managed by the Security CPU 11 as the security assurance data 114, and decrypts a designated program or data using the encryption key indicated by the information. In addition, when the module that controls the encryption function supports a plurality of algorithms, it also obtains a type of an algorithm as a parameter.

When the recovery execution module 113 overwrites the firmware for normal operation 32-1 to the firmware for recovery 34-1, for example, it first reads the firmware for recovery 34-1 from the nonvolatile memory 30 (a1 in FIG. 2). As described above, the firmware for recovery 34-1 is encrypted and stored in the nonvolatile memory 30. The recovery execution module 113 instructs the module that controls the encryption function to decrypt the firmware for recovery 34-1 read from the nonvolatile memory 30. The recovery execution module 113 stores the decrypted firmware for recovery 34-1 in the volatile memory 20 (a2 in FIG. 2). Note that after the encrypted firmware for recovery 34-1 is stored in the volatile memory 20, the recovery execution module 113 may instruct the module that controls the encryption function to decrypt the encrypted firmware. The firmware for recovery on the volatile memory 20 illustrated in FIG. 2 is the decrypted firmware for recovery.

Next, the recovery execution module 113 verifies the reliability of the firmware for recovery 34-1 stored in the volatile memory 20, using the security assurance data 114 managed by the Security CPU 11 (a3 in FIG. 2). If the verification is successful, the recovery execution module 113 overwrites the firmware for normal operation 32-1 on the nonvolatile memory 30 to the firmware for recovery 34-1 (a4 in FIG. 2), and reboots the storage device 1. If the verification is unsuccessful, the recovery execution module 113 may notify the host 2 of an error. When the recovery execution module 113 notifies the host 2 of the error, it may stop the storage device 1.

The recovery execution module 113 may verify the reliability of the firmware for recovery in encrypted state using the security assurance data 114 managed by the Security CPU 11 and, if the verification is successful, instruct the module that controls the encryption function to decrypt the firmware for recovery.

Since the firmware for recovery is stored in the nonvolatile memory 30 with higher reliability than the firmware for normal operation, the storage device 1 can decrease the cost for recovery operation such as operation of requesting the manufacturer or the like to recover the firmware of the storage device 1 and thus improve in its availability.

If the firmware for recovery has the minimum necessary function of recovering the firmware for normal operation, such as acquiring the regular firmware for normal operation from the host 2, the storage device 1 that is rebooted by the recovery execution module 113 operates by the following procedure, for example.

First, the storage device 1 verifies the reliability of the firmware for recovery by the secure boot function. Since the firmware for recovery is stored in the nonvolatile memory 30 with high reliability, the verification succeeds, and the storage device 1 starts the operation according to the procedure provided by the firmware for recovery.

The storage device 1 then acquires the firmware for normal operation from the host 2. If, for example, an interface connecting the storage device 1 and the host 2 supports access to the memory in the host 2 from the storage device 1, the firmware for normal operation may be read and acquired from the memory in the host 2. Alternatively, it may be acquired by sending to the host 2 a command requesting transfer of the firmware for normal operation. Alternatively, the storage device 1 may simply transmit, to the host 2, for example, a message indicating that the firmware needs to be updated, and thereafter, the firmware for normal operation may be updated under the initiative of the host 2.

The storage device 1 overwrites the firmware on the nonvolatile memory 30, which has been overwritten to the firmware for recovery, to the firmware for normal operation acquired from the host 2 again. After this overwrite, the storage device 1 is rebooted.

When the firmware for normal operation is acquired from the host 2, information for verifying the reliability of the firmware for normal operation and an encryption key for decryption may be acquired together and managed again by the Security CPU 11 as security assurance data 114.

Figure 3:
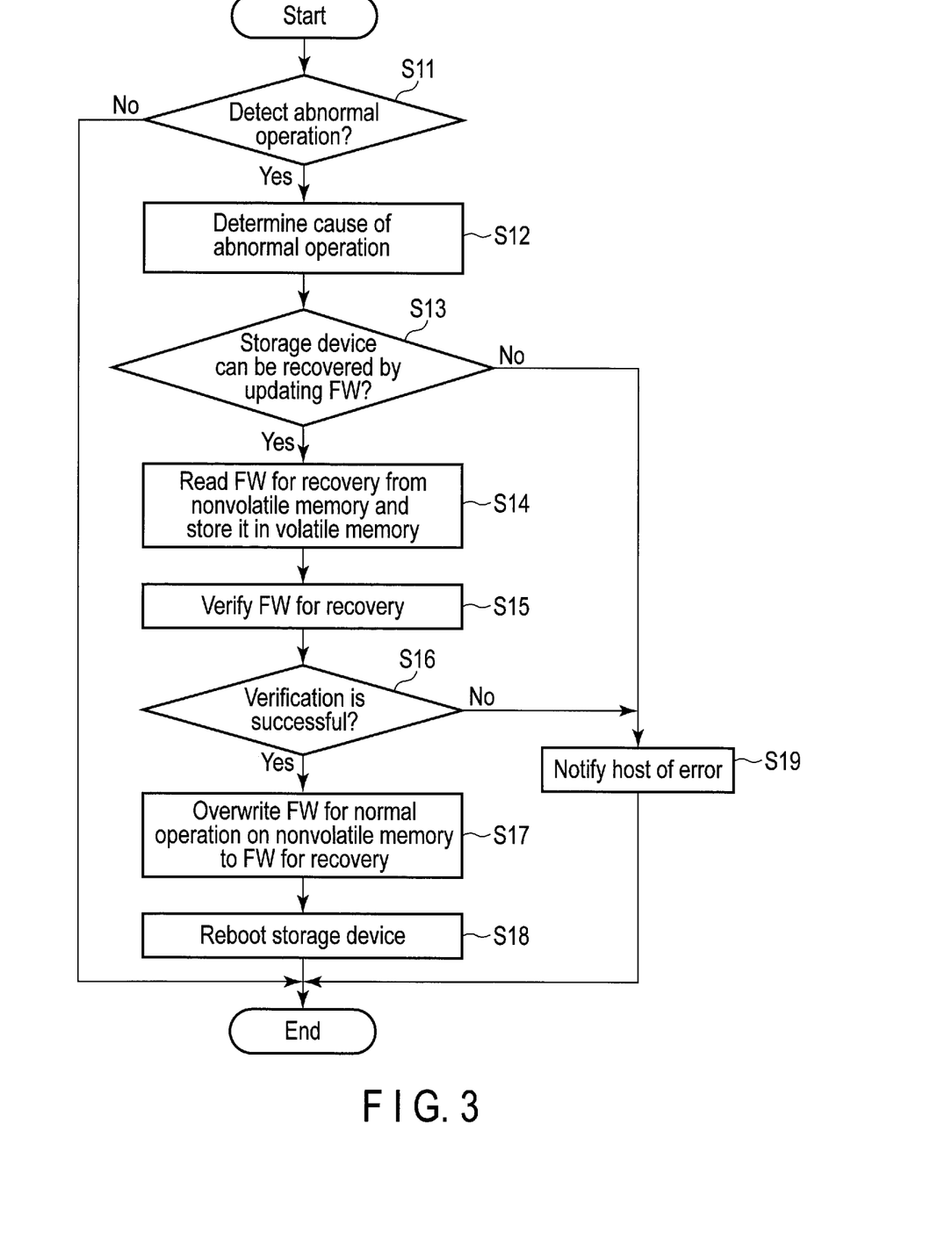
FIG. 3 is a flowchart illustrating an operation procedure for recovering firmware according to the storage device of the first embodiment.

FIG. 3 is a flowchart illustrating an operation procedure for recovering the firmware of the storage device 1 according to the first embodiment.

The detector 111 detects an abnormal operation of the storage device 1 (more specifically, Security CPU 11, CPU-A 12-1 or CPU-B 12-2) (S11). If the abnormal operation is detected (Yes in S11), the recovery determination module 112 determines a cause of the abnormal operation (S12). For example, the recovery determination module 112 determines whether the abnormal operation is caused by a hardware failure. Based on the determination result of the cause of the abnormal operation, the recovery determination module 112 determines whether the storage device 1 can be recovered by updating the firmware for normal operation (Security CPU FW 31, CPU-A 12-1 or CPU-B 12-2) (S13).

If the recovery determination module 112 determines that the storage device 1 can be recovered by updating the firmware (Yes in S13), the recovery execution module 113 reads the firmware for recovery (Security CPU FW 33 for recovery, CPU-A FW 34-1 for recovery or CPU-B FW 34-2 for recovery) from the nonvolatile memory 30 and stores it in the volatile memory 20 (S14). The recovery execution module 113 verifies the reliability of the firmware for recovery using the security assurance data 114 managed by the Security CPU 11 (S15).

If the verification is successful (Yes in S16), the recovery execution module 113 overwrites the firmware for normal operation on the nonvolatile memory 30 to the firmware for recovery (S17) and reboots the storage device 1 (S18).

In contrast, when the recovery determination module 112 determines that the storage device 1 in which the abnormal operation has been detected cannot be recovered by recovering the firmware (No in S13) or when the verification of reliability of the firmware for recovery by the recovery execution module 113 is unsuccessful (No in S16), the recovery determination module 112 or the recovery execution module 113 notifies the host of an error (S19).

As described above, the storage device 1 that stores the firmware for recovery in the nonvolatile memory 30 with higher reliability than the firmware for normal operation makes it possible to recover the firmware with high reliability.

Second Embodiment

A second embodiment will be described below.

Figure 4:
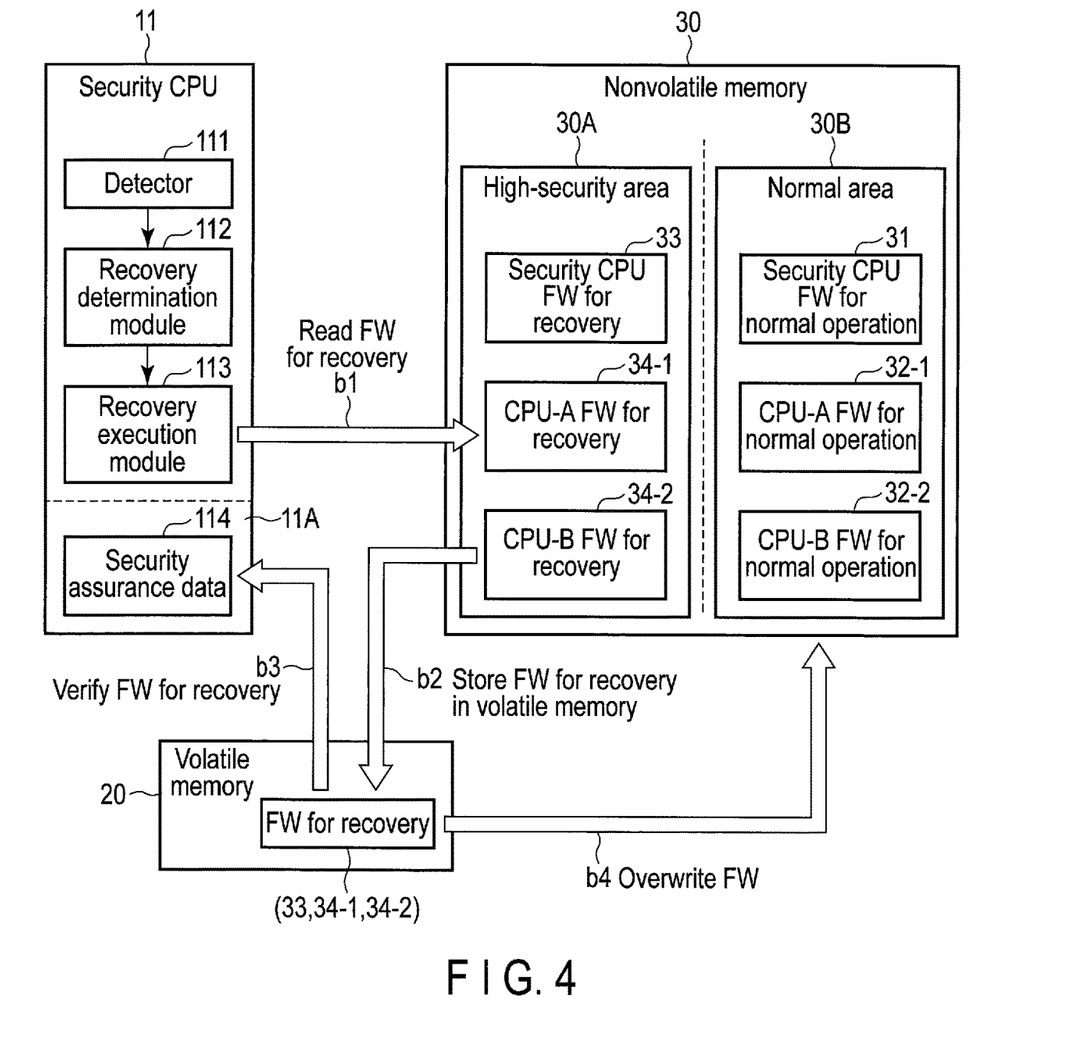
FIG. 4 is a block diagram illustrating a function of recovering firmware of a storage device according to a second embodiment.

FIG. 4 is a block diagram illustrating a function of recovering the firmware of a storage device 1 according to the second embodiment. Like in the first embodiment, the storage device 1 of the second embodiment also includes a controller 10, a volatile memory 20 and a nonvolatile memory 30. In the second embodiment, the same components as those of the first embodiment are denoted by the same reference symbols and their duplicated descriptions will be omitted.

In the storage device 1 of the second embodiment, a partition whose access authority is limited to the Security CPU 11 is defined on the nonvolatile memory 30, and firmware for recovery (33, 34-1 and 34-2) is stored in the partition. Limiting access authority to the Security CPU 11 means that the memory can be accessed only by the Security CPU 11 or it can be accessed only by the instruction from the Security CPU 11. The accessibility only by the instruction from the Security CPU 11 means, for example, that the CPU-A 12-1 and the CPU-B 12-2 can be accessed only under the control of the Security CPU 11.

The partition whose access authority is limited to the Security CPU 11 is defined, for example, in the manufacturing process of the storage device 1. The partition is provided such that it cannot be targeted for an external command including control commands.

In the second embodiment, an area within the partition whose access authority is limited to the Security CPU 11 will be referred to as a high-security area 30A, and an area other than the partition on the nonvolatile memory 30 will be referred to as a normal area 30B. For example, CPU-A FW 32-1 for normal operation of the CPU-A 12-1 is stored in the normal area 30B that can be accessed by the CPU-A 12-1. That is, the firmware for normal operation (31, 32-1 and 32-2) is stored in the normal area 30B.

As described above, in the storage device 1 of the second embodiment, firmware for recovery is stored in the high-security area 30A, which is an area within the partition whose access authority is limited to the Security CPU 11, resulting in that the firmware for recovery can be stored in the nonvolatile memory 30 with higher reliability than the firmware for normal operation.

In the storage device 1 according to the second embodiment, too, when the firmware for recovery is stored in the high-security area 30A, it may be encrypted using an algorithm whose encryption strength is higher (or using an encryption key whose key length is greater) than the firmware for normal operation, which is stored in the normal area 30B.

When the recovery execution module 113 in the storage device 1 of the second embodiment overwrites, for example, firmware for normal operation 32-1 to firmware for recovery 34-1, it reads the firmware for recovery 34-1 from the high-security area 30A of the nonvolatile memory 30 (b1 in FIG. 4). After that, the recovery execution module 113 performs the process by the same procedure as in the first embodiment. That is, the recovery execution module 113 stores the read firmware for recovery 34-1 in the volatile memory 20 (b2 in FIG. 4) and verifies the reliability of the firmware for recovery 34-1 stored in the volatile memory 20 using security assurance data 114 managed by the Security CPU 11 (b3 in FIG. 4).

If the verification is successful, the recovery execution module 113 overwrites the firmware for normal operation 32-1 on the nonvolatile memory 30 to the firmware for recovery 34-1 (b4 in FIG. 4) to reboot the storage device 1. If the verification is unsuccessful, the recovery execution module 113 may notify the host 2 of an error. When the recovery execution module 113 notifies the host 2 of the error, it may stop the storage device 1.

As described above, the firmware for recovery is stored in the high-security area 30A, which is an area within the partition whose access authority is limited to the Security CPU 11. Thus, in the storage device 1 according to the second embodiment, which stores the firmware for recovery in the nonvolatile memory 30 with higher reliability than the firmware for normal operation, it is possible to reduce the cost for the recovery operation such as requesting the manufacturer or the like to recover the storage device and thus to improve the availability, as in the first embodiment.

That is, the storage device 1 of the second embodiment also makes it possible to recover the firmware with high reliability.

Third Embodiment

A third embodiment will be described below.

Figure 5:
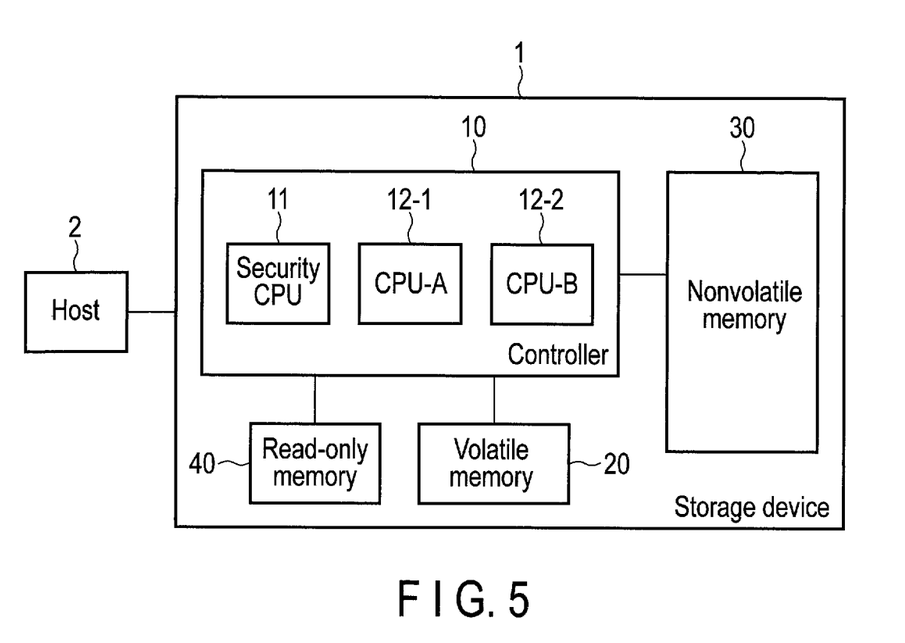
FIG. 5 is a block diagram illustrating an exemplary configuration of a storage device according to a third embodiment.

FIG. 5 is a block diagram illustrating an exemplary configuration of a storage device 1 according to the third embodiment.

The storage device 1 according to the third embodiment further includes a read-only memory 40 such as a mask ROM as compared with the first and second embodiments. The access authority of the read-only memory 40 is limited to the Security CPU 11. Limiting access authority to the Security CPU 11 means that the memory can be accessed only by the Security CPU 11 or it can be accessed only by the instruction from the Security CPU 11. The accessibility only by the instruction from the Security CPU 11 means, for example, that the CPU-A 12-1 and the CPU-B 12-2 can be accessed only under the control of the Security CPU 11. In the third embodiment, the same components as those of the first and second embodiments are denoted by the same reference symbols and their duplicated descriptions will be omitted.

Figure 6:
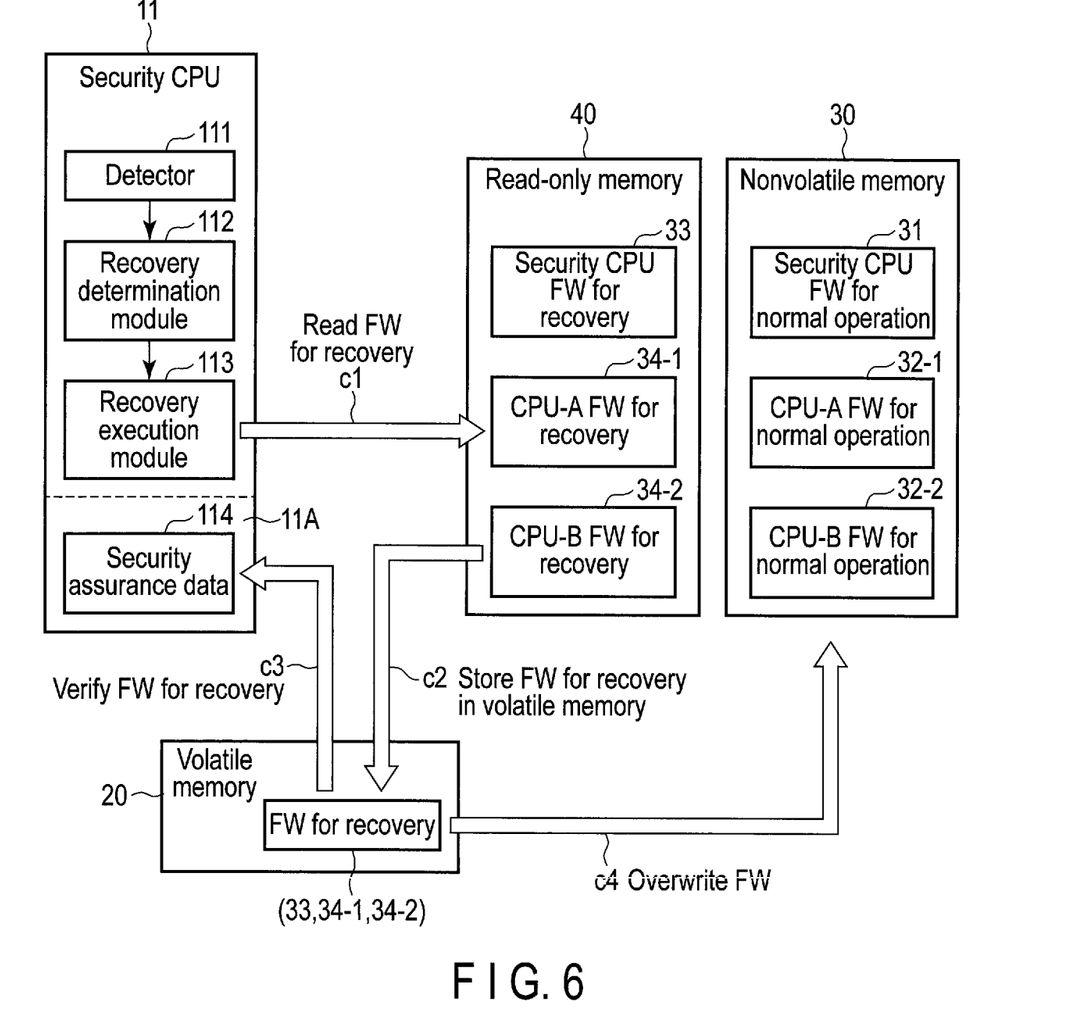
FIG. 6 is a block diagram illustrating a function of recovering firmware of the storage device according to the third embodiment.

FIG. 6 is a block diagram illustrating a function of recovering the firmware of the storage device 1 according to the third embodiment.

In the storage device 1 according to the third embodiment, firmware for recovery (33, 34-1 and 34-2) is stored in the read-only memory 40 whose access authority is limited to the Security CPU 11. That is, in the storage device 1 according to the third embodiment, the read-only memory 40 whose access authority is limited to the Security CPU 11 is used to store firmware for recovery, resulting in that the firmware for recovery can be stored with higher reliability than the firmware for normal operation.

When the firmware for recovery is stored in the large-capacity nonvolatile memory 30 as in the first and second embodiments, the firmware for recover may be the same as the firmware for normal operation prepared as a backup, or may be firmware having the minimum necessary function of recovering the firmware for normal operation such as acquiring regular firmware for normal operation from the host 2, as described in the first embodiment. In contrast, in a case where the read-only memory 40 is provided for the purpose of storing the firmware for recovery with high reliability, it is required to reduce the capacity of the read-only memory 40 as much as possible in order to reduce the cost. It is preferable to set the capacity to, for example, about 500 Kbytes. In consideration of this point, the storage device 1 according to the third embodiment has the minimum necessary function of recovering the firmware for normal operation, such as acquiring the regular firmware for normal operation from the host 2. That is, the capacity of the read-only memory 40 may be much smaller than the capacity required to store the firmware for normal operation.

When the recovery execution module 113 in the storage device 1 of the third embodiment overwrites, for example, firmware for normal operation 32-1 to firmware for recovery 34-1, it reads the firmware for recovery 34-1 from the read-only memory 40 whose access authority is limited to the Security CPU 11 (c1 in FIG. 6). After that, the recovery execution module 113 performs the process by the same procedure as in the first and second embodiments. That is, the recovery execution module 113 stores the read firmware for recovery 34-1 in the volatile memory 20 (c2 in FIG. 6) and verifies the reliability of the firmware for recovery 34-1 stored in the volatile memory 20 using security assurance data 114 managed by the Security CPU 11 (c3 in FIG. 6).

If the verification is successful, the recovery execution module 113 overwrites the firmware for normal operation 32-1 on the nonvolatile memory 30 to the firmware for recovery 34-1 (c4 in FIG. 6) to reboot the storage device 1. If the verification is unsuccessful, the recovery execution module 113 may notify the host 2 of an error. When the recovery execution module 113 notifies the host 2 of the error, it may stop the storage device 1.

In the storage device 1 according to the third embodiment, it is assumed that the firmware for recovery has the minimum necessary function of recovering the firmware for normal operation, such as acquiring the regular firmware for normal operation from the host 2, as described above. Accordingly, the storage device 1, which is rebooted after the reliability of the firmware for recovery 34-1 is verified successfully and the firmware for normal operation 32-1 is overwritten to the firmware for recovery 34-1, operates in accordance with, e.g., the following procedure, as has been described for the first embodiment.

First, the storage device 1 verifies the reliability of the firmware for recovery by the secure boot function. When the verification of the firmware for recovery read from the read-only memory 40 whose access authority is limited to the Security CPU 11 is successful, the storage device 1 is booted to operate in accordance with the procedure provided by the firmware for recovery.

The storage device 1 acquires the firmware for normal operation from the host 2, and overwrites the firmware on the nonvolatile memory 30, which has been overwritten to the firmware for recovery, to the firmware for normal operation acquired from the host 2 again. After that, the storage device 1 is rebooted.

As described above, even in the storage device 1 according to the third embodiment, the read-only memory 40 whose access authority is limited to the Security CPU 11 is used to store firmware for recovery, resulting in that the firmware for recovery can be stored with higher reliability than the firmware for normal operation. Like the storage devices of the first and second embodiments, the storage device 1 of the third embodiment can decrease the cost for recovery operation such as requesting the manufacturer or the like to recover the firmware and thus improve in its availability.

That is, the storage device 1 also makes it possible to recover firmware with high reliability.

The above description is directed to an example in which the storage device 1 further includes the read-only memory 40 such as a mask ROM, whose access authority is limited to the Security CPU 11, as a storage element that stores the firmware for recovery. In other words, the above description is directed to an example of using the read-only memory 40 as a non-rewritable storage element to store the firmware for recovery with higher reliability than the firmware for normal operation to be stored in the nonvolatile memory 30. As one modification to the example, an example of using a rewritable storage element, such as a NOR flash memory, in place of the read-only memory 40, will be described.

In the modification, it is assumed that a NOR flash memory is externally attached to the controller 10 as a storage element that stores firmware for recovery. The access authority of the NOR flash memory is limited to the Security CPU 11. In the modification in which the firmware for recovery is stored in a writable NOR flash memory, verification data for verifying the reliability of the firmware for recovery stored in the NOR flash memory is stored in, for example, a fuse element (eFuse) which stores data by electrically changing the characteristics of element irreversibly. The eFuse may be provided inside the controller 10 or outside the controller 10. The verification data is, for example, a hash value.

When the recovery execution module 113 reads the firmware for recovery from the NOR flash memory, and overwrites firmware for normal operation on the nonvolatile memory 30 to the read firmware for recovery, it verifies the reliability of the read firmware for recovery using the verification data stored in the eFuse. If the verification is successful, the recovery execution module 113 overwrites the firmware for normal operation on the nonvolatile memory 30 to the firmware for recovery. As described above, in the modification, too, the firmware for recovery can be stored with higher reliability than the firmware for normal operation.

The modification brings about the advantage that the firmware for recovery to be stored in the NOR flash memory can be changed during the manufacture of the storage device 1, as compared with the case of the read-only memory 40 such as a mask ROM. Since, furthermore, the verification data for verifying the reliability of the firmware for recovery is stored in the eFuse, the reliability of the firmware for recovery can be assured even in a case where the NOR flash memory storing the firmware for recovery therein is replaced. Alternatively, when the firmware for recovery is stored in the read-only memory 40 such as a mask ROM, verification data for verifying the reliability of the firmware for recovery may be recorded in the eFuse.

In the third embodiment, on the assumption that the firmware for recovery has the minimum necessary function of recovering the firmware for normal operation, such as acquiring regular firmware for normal operation from the host 2, the firmware for normal operation on the nonvolatile memory 30 is overwritten to the firmware for recovery to reboot the storage device 1. In a case where the firmware for recovery has the minimum necessary function of recovering the firmware for normal operation, instead of overwriting the firmware for normal operation on the nonvolatile memory 30 to the firmware for recovery, the firmware for recovery, which has been stored in the volatile memory 20 and then has been succeeded in verification of reliability using the security assurance data 114, may acquire the regular firmware for normal operation from the host 2 and overwrite the firmware for normal operation, which has been tampered with, on the nonvolatile memory 30 to the regular firmware for normal operation acquired from the host 2. In this case, the storage device 1 has only to be rebooted only once.

Fourth Embodiment

A fourth embodiment will be described below.

Figure 7:
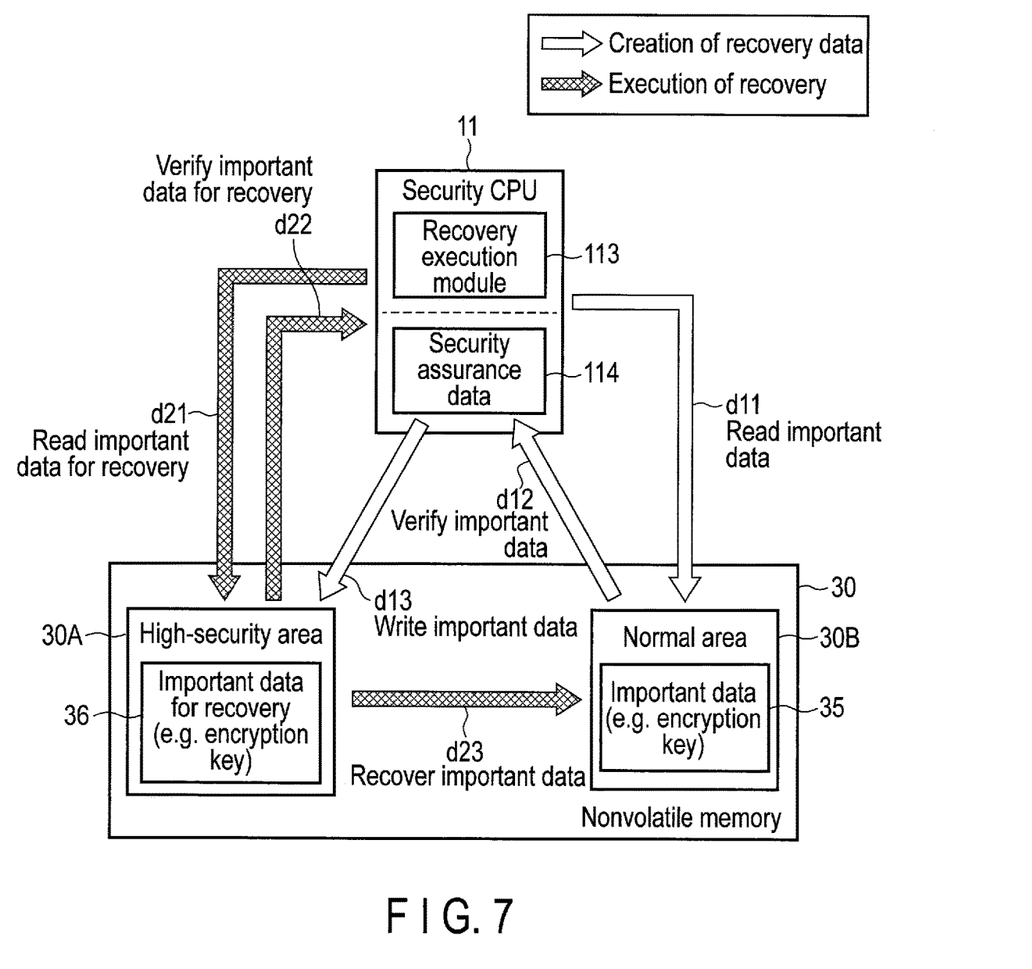
FIG. 7 is a block diagram illustrating a function of recovering firmware of a storage device according to a fourth embodiment.

FIG. 7 is a block diagram illustrating a function of recovering firmware of a storage device 1 according to the fourth embodiment. The storage device 1 according to the fourth embodiment also includes a controller 10, a volatile memory 20 and a nonvolatile memory 30, as in the first to third embodiments. In the fourth embodiment, the same components as those of the first to third embodiments are denoted by the same reference symbols and their duplicated descriptions will be omitted.

Like in the first embodiment, in the storage device 1 according to the fourth embodiment, a partition whose access authority is limited to the Security CPU 11 is set in the nonvolatile memory 30, and firmware for recovery is stored in the partition. That is, in the storage device 1 according to the fourth embodiment, a high-security area 30A is provided on the nonvolatile memory 30.

In the storage device 1 according to the fourth embodiment, it is assumed that the firmware for normal operation processes important data such as an encryption key. The important data is stored in a normal area 30B of the nonvolatile memory 30 in the same manner as the firmware for normal operation. Information for verifying the reliability is managed by the Security CPU 11 as security assurance data 114. Furthermore, in the storage device 1 according to the fourth embodiment, the important data can be updated with specific timing by an instruction based on a command from the host 2, internal processing of the storage device 1, and the like.

In a case where the firmware for normal operation is to be recovered, if the latest important data is lost, the rebooted storage device 1 cannot operate normally. In the storage device 1 according to the fourth embodiment, thus, important data 36 for recovering important data 35 is stored in the high-security area 30A on the nonvolatile memory 30.

For example, when the important data 35 is to be updated at specific timing, the recovery execution module 113 in the storage device 1 according to the fourth embodiment reads the updated important data 35 from the normal area 30B of the nonvolatile memory 30 (d11 in FIG. 7). Note that the recovery execution module 113 may store the important data 36 for recovery in the high-security area 30A at timing different from the timing when the important data 35 is updated. That is, the timing of reading the important data 35 from the normal area 30B, which is indicated by reference symbol d11, is not limited to a specific timing of updating the important data 35.

The recovery execution module 113 verifies the reliability of the important data 35 read from the normal area 30B, using the security assurance data 114 managed by the Security CPU 11 (d12 in FIG. 7). If the verification is successful, the recovery execution module 113 writes the read important data 35 into the high-security area 30A (d13 in FIG. 7). If the verification is unsuccessful, the recovery execution module 113 may notify the host 2 of an error. When the recovery execution module 113 notifies the host 2 of the error, it may stop the storage device 1.

When the firmware for normal operation is recovered, the recovery execution module 113 reads the important data 36 for recovery from the high-security area 30A of the nonvolatile memory 30 (d21 in FIG. 7). Since the procedure for recovering the firmware for normal operation itself has been described in the first embodiment, its description will be omitted.

The recovery execution module 113 verifies the reliability of the read important data 36 for recovery using the security assurance data 114 managed by the Security CPU 11 (d22 in FIG. 7). If the verification is successful, the recovery execution module 113 overwrites the important data 35 stored in the normal area 30B of the nonvolatile memory 30 to the important data 36 for recovery.

In the storage device 1 according to the fourth embodiment, the important data processed by the firmware for normal operation is updated with specific timing and the latest important data is recovered when the firmware for normal operation is recovered. It is thus possible to use the storage device 1 continuously from a state before its abnormal operation is detected and improve in its availability.

The fourth embodiment described above is directed to an example in which a partition whose access authority is limited to the Security CPU 11 is defined on the nonvolatile memory 30 to store important data to be processed by the firmware for recovery and the firmware for normal operation. In a case where the firmware for recovery is stored in a writable storage element such as a NOR flash memory and verification data for verifying the reliability of the firmware for recovery is stored in the eFuse, which has been described as a modification to the third embodiment, a backup of important data to be processed by the firmware for normal operation may be stored in the NOR flash memory. The verification data is stored in the eFuse only for the firmware for recovery which is not to be updated. Even if the important data is simply stored in the NOR flash memory whose access authority is limited to the Security CPU 11, the reliability of the important data is secured at a high level.

In this case, the combination of storing the firmware for recovery, in which the verification data is stored in eFuse and which is not to be updated, in an area of the NOR flash memory and storing the important data, which is to be updated, in another area of the NOR flash memory can be realized at low cost.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a nonvolatile memory; and
a controller configured to control data write to the nonvolatile memory and data read from the nonvolatile memory based on a command from a host,
wherein:
the controller includes at least one processor;
the nonvolatile memory stores first firmware for normal operation and second firmware for recovery, the first firmware being firmware to cause the at least one processor to control the data write and the data read based on the command, the second firmware being firmware to cause the at least one processor to recover the first firmware;
the second firmware is stored in the nonvolatile memory with higher reliability than the first firmware;
the at least one processor includes a first processor and a second processor, the first processor having a function of verifying reliability of the first firmware and the second firmware, the second processor being to execute the first firmware;
the nonvolatile memory includes a first area to be accessed by the first processor but not to be accessed by the second processor;
the second firmware is stored in the first area; and
the first firmware is stored in a second area other than the first area of the nonvolatile memory.

2. The storage device of claim 1, wherein:
the first firmware and the second firmware are encrypted; and
the second firmware is encrypted using an algorithm whose encryption strength is higher than the first firmware, or the second firmware is encrypted using an encryption key whose key length is greater than the first firmware.

3. The storage device of claim 1, wherein the second firmware is encrypted.

4. The storage device of claim 1, wherein the first area stores data to be used by the first processor when the first processor recovers the first firmware by executing the second firmware.

5. The storage device of claim 1, wherein:
the first firmware and the second firmware are encrypted; and
the second firmware is encrypted using an algorithm whose encryption strength is higher than the first firmware, or the second firmware is encrypted using an encryption key whose key length is greater than the first firmware.

6. The storage device of claim 1, wherein the second firmware includes a program which causes the first processor to perform a first process and a second process, the first process being a process of acquiring regular first firmware from the host, the second process being a process of overwriting the first firmware stored in the second area of the nonvolatile memory to the regular first firmware acquired from the host.

7. The storage device of claim 1, wherein the first processor is further configured to:
detect an abnormal operation of the storage device;
determine whether the storage device whose abnormal operation has been detected is to be recovered by recovering the first firmware; and
recover the first firmware by executing the second firmware when it is determined that the storage device is to be recovered.

8. The storage device of claim 1, wherein the first processor is configured to overwrite the first firmware to be recovered into the second firmware, and to reboot the storage device.

9. The storage device of claim 8, further comprising a volatile memory,
wherein the first processor is configured to execute the second firmware read in the volatile memory.

10. A storage device comprising:
a first nonvolatile memory;
a second nonvolatile memory which stores data including a program with higher reliability than the first nonvolatile memory; and
a controller configured to control data write to the first nonvolatile memory and data read from the first nonvolatile memory based on a command from a host,
wherein:
the controller includes at least one processor;
the first nonvolatile memory stores first firmware to cause the at least one processor to control the data write and the data read based on the command;
the second nonvolatile memory stores second firmware to recover the first firmware;
the at least one processor includes a first processor and a second processor the first processor having a function of verifying reliability of the first firmware and the second firmware, the second processor being to execute the first firmware; and
the second nonvolatile memory is to be accessed by the first processor but not to be accessed by the second processor.

11. The storage device of claim 10, wherein the second nonvolatile memory has a capacity that is smaller than a capacity necessary to store the first firmware.

12. The storage device of claim 11, wherein the capacity of the second nonvolatile memory is 500 Kbytes or less.

13. The storage device of claim 10, wherein the second nonvolatile memory comprises a read-only memory.

14. The storage device of claim 13, further comprising a fuse element configured to store data by electrically changing characteristics of element irreversibly,
wherein the fuse element stores verification data to verify the second firmware stored in the second nonvolatile memory.

15. The storage device of claim 10, wherein the second firmware includes a program which causes the first processor to perform a first process and a second process, the first process being a process of acquiring regular first firmware from the host, the second process being a process of overwriting the first firmware stored in the first nonvolatile memory to the regular first firmware acquired from the host.

16. The storage device of claim 10, wherein the first processor includes a built-in memory which stores verification data to verify the first firmware, and is configured to determine whether the first firmware is tampered with by verification using the verification data stored in the built-in memory.

17. The storage device of claim 10, wherein the second nonvolatile memory stores data to be used by the first processor when the first processor recovers the first firmware by executing the second firmware.

18. The storage device of claim 10, wherein the first processor is further configured to:
  detect an abnormal operation of the storage device;
  determine whether the storage device whose abnormal operation has been detected is to be recovered by recovering the first firmware; and
  recover the first firmware by executing the second firmware when it is determined that the storage device is to be recovered.

19. The storage device of claim 18, wherein the first processor is configured to overwrite the first firmware to be recovered into the second firmware, and to reboot the storage device.

20. The storage device of claim 18, further comprising a volatile memory,
  wherein the first processor is configured to execute the second firmware read in the volatile memory.

* * * * *